Patented Jan. 26, 1954

2,667,501

UNITED STATES PATENT OFFICE 2,667,501

CYCLOPENTADIENYLSILANES

Robert W. Martin, Lafayette, Calif., assignor to General Electric Company, a corporation of New York No Drawing. Application February 10, 1953, Serial No. 336,195

5 Claims. (Cl. 260—448.2)

This invention is concerned with cyclopentadienylsilanes and more particularly relates to compositions of matter having the general formula I 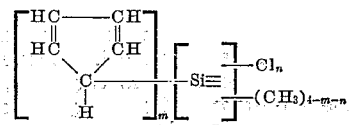

where $m$ is an integer equal to from 1 to 2, inclusive, and $n$ is a whole number equal to from 0 to 2, inclusive, the sum of $m$ and $n$ being equal to, at most, 3.

The compositions herein defined can be employed as intermediates in the preparation of other compositions of matter. Thus, the hydrolyzable cyclopentadienylsilanes containing silicon-bonded chlorine can be hydrolyzed alone or cohydrolyzed with other organohalogenosilanes, e. g., methylchlorosilanes, to give organopolysiloxane resins, rubbers and oils. When employed for making organopolysiloxane resins, the presence of the double unsaturation may impart to such resins air-drying properties and accelerate the rate at which such resins convert to the substantially infusible and insoluble state. Cyclopentadienylsilanes herein described are also useful in making adducts with, for instance, maleic anhydride, which can be used in the preparation of alkyd resins by employing the reaction product as a source of polycarboxylic acid for reaction with the polyhydric alcohol. Modifications of such types of alkyd resins with, for instance, various types of oils, including drying and semi-drying oils, recommend such materials for coating applications.

Several methods may be employed for preparing the compositions herein defined. One method comprises forming a Grignard reagent between cyclopentadiene and ethyl magnesium bromide to give the cyclopentadienyl Grignard having the formula II 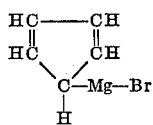

This cyclopentadienyl Grignard can then be reacted with various methyl chlorosilanes, for example, methyltrichlorosilane, dimethyldichlorosilane, and trimethylchlorosilane to prepare the cyclopentadienylsilanes embraced by the above general Formula I. Obviously instead of employing the methylchlorosilanes described above, one may employ other methylhalogenosilanes, for example, methylbromo silanes, etc. By using other organohalogenosilanes, for example, phenyltrichlorosilane, diphenyldichlorosilane, triphenylchlorosilane, etc., with the above Grignard reagent, one can prepare in the same manner cyclopentadienesilanes containing silicon-bonded phenyl radicals in place of the silicon-bonded methyl radicals.

In order that those skilled in the art may better understand how the present invention may be practiced, the following examples are given by way of illustration and not by way of limitation. All parts are by weight.

Example 1

Ethyl magnesium bromide was prepared by mixing together 44.6 grams magnesium turnings, 200 grams ethyl bromide, and 550 cc. ethyl ether. This Grignard solution was refluxed for about one-half hour at the reflux temperature of the mass, cooled and thereafter 550 cc. thiophene-free benzene was added and the diethyl ether removed by distillation. To the remaining benzene solution was slowly added 121 grams cyclopentadiene. The mixture was then heated for 1½ hours at 60° C. During this heating period, ethane was observed evolving from the reaction mass. There was thus obtained an ethyl ether solution of cyclopentadienyl magnesium bromide having the formula

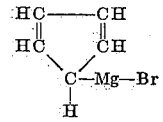

Example 2

About one-half of the cyclopentadienyl magnesium bromide solution prepared in Example 1 (corresponding to about 50.5 grams cyclopentadiene) was added slowly to a solution of 99.5 grams trimethylchlorosilane in 150 cc. benzene. The reaction mixture was refluxed for about 30 minutes and the inorganic precipitate which formed was filtered off and washed with benzene. The washings and liquid filtrate were combined and fractionally distilled to give a colorless liquid product boiling at about 43–44° C. at 19 mm. This compound was identified as cyclopentadienyl trimethylsilane as evidenced by the fact that analysis of this compound showed it to contain 19.7% silicon and to have a molecular weight of 135 (theoretical 20.3% silicon; theoretical molecular weight 138).

Example 3

An adduct was prepared by mixing together 22 parts maleic anhydride and a solution of 31 parts of the cyclopentadienyl trimethyl silane prepared in Example 2 with 87.9 parts benzene at room temperature. The reaction between the ingredients was instantaneously exothermic. The reaction mixture was allowed to stand with mixing at room temperature for about two hours and was then concentrated by blowing it with air until most of the solvent was evaporated. The remaining composition was filtered to give about 40 parts of a white crystalline material which when recrystallized from glacial acetic acid melted at about 105° C. This compound was identified as 3,6-endo-trimethylsilyl methylene-1,2,3,6-tetrahydrophthalic anhydride as evidenced by the fact that analysis showed it to contain 11.4% silicon (theoretical 11.86% silicon).

Example 4

The remaining half (about 50.5 grams) of the above-described cyclopentadienyl magnesium bromide solution (see Examples 1 and 2) was added gradually to a solution of 207 grams dimethyldichlorosilane in 250 cc. benzene. The reaction mixture was then heated at the reflux temperature of the mass for about 15½ hours, the precipitate which formed was filtered, washed with benzene, and the washings and filtrate combined and fractionally distilled to give a colorless liquid boiling at about 73° C. at 25 mm. This compound was identified as bis-(cyclopentadienyl) dimethylsilane as evidenced by the fact that it was found to contain 14.5% silicon (theoretical 14.89% silicon).

Further fractionation of the product described in Example 4 above also gave a higher boiling liquid which distilled at about 80–83° C. at 0.7 mm. This compound was identified as cyclopentadienyl dimethylchlorosilane as evidenced by the fact that is was found to contain 16.6% silicon which is very close to the theoretical percent silicon for this compound of 17.66%.

Example 5

Cyclopentadienylmethyldichlorosilane was again prepared by forming a Grignard reagent similarly as was done in Example 1 from 43.1 grams cyclopentadiene added gradually to a solution of 196 grams methyltrichlorosilane in 300 cc. benzene, and the reaction mixture refluxed for about 15 hours. The inorganic precipitate was removed by filtration, and washed several times with benzene. The washings and filtrate were combined and fractionally distilled to remove the benzene and excess methyltrichlorosilane and to give cyclopentadienyl methyldichlorosilane. The identity of this compound was established by refluxing approximately one-half of the above-prepared cyclopentadienyl methyl dichlorosilane solution in benzene with an excess of acetic anhydride for 1½ hours. Thereafter, the benzene and excess acetic anhydride and other low boiling materials were removed by distillation and the remaining liquid fractionated to give a colorless liquid distilling at about 137–140° C. at 0.7 mm. Analysis of this acetoxy derivative showed it to have a saponification equivalent of about 111 as compared to the theoretical saponification equivalent for the cyclopentadienyl methyl diacetoxysilane of 113.

The other half of the cyclopentadienyl methyldichlorosilane solution in benzene was reacted with approximately an equivalent weight of maleic anhydride. After allowing the reaction mixture to stand for about two hours, the benzene was removed and the remaining material solidified on standing at room temperature. This solid material was washed several times with benzene and then dried over $P_2O_5$ for about 1½ hours to give essentially pure 3,6-endomethyldichlorosilylmethylene - 1,2,3 - tetrahydrophthalic anhydride as evidenced by the fact that analysis showed it to contain about 11.3% silicon as compared to the theoretical value of about 10.1% silicon.

Obviously it will be apparent to those skilled in the art, that by employing the proper conditions, e. g., those disclosed in the foregoing examples, one can obtain other compounds coming within the general formula

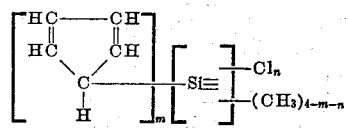

where $m$ and $n$ have the meanings given above, as, for instance, di(cyclopentadienyl) dimethylsilane, etc.

What I claim as new and desire to secure by Letters Patent of the United States is:

1. A composition of matter corresponding to the general formula

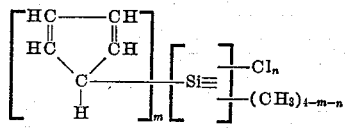

where $m$ is an integer equal to from 1 to 2, inclusive, and $n$ is a whole number equal to from 0 to 2, inclusive, the total of $m+n$ being at most 3.
2. Cyclopentadienyl trimethylsilane.
3. Bis-(cyclopentadienyl) dimethylsilane.
4. Cyclopentadienyldimethylchlorosilane.
5. Cyclopentadienylmethyldichlorosilane.

ROBERT W. MARTIN.

References Cited in the file of this patent

UNITED STATES PATENTS

| Number | Name | Date |
|---|---|---|
| 2,642,447 | Plueddemann | June 16, 1953 |